United States Patent [19]

Naqvi

[11] 4,311,271
[45] Jan. 19, 1982

[54] CONTROLLER FOR MAINTAINING A CONSTANT TEMPERATURE OF DISCHARGED LIQUID

[76] Inventor: Zargham H. Naqvi, C-13, Sadat Colony, Karachi-25, Drigh Township, Pakistan

[21] Appl. No.: 154,297

[22] Filed: May 29, 1980

[51] Int. Cl.³ ............................................. G05D 23/13
[52] U.S. Cl. .................................... 236/12 R; 74/110; 251/251
[58] Field of Search ............................ 236/12.23, 12.2; 251/251; 74/55, 110, 569

[56] References Cited

U.S. PATENT DOCUMENTS

| | | | |
|---|---|---|---|
| 2,282,152 | 5/1942 | Babbin | 236/12.2 |
| 2,449,261 | 9/1948 | Watrous et al. | 236/12.2 |
| 2,562,875 | 8/1951 | Ashton | 236/12.2 |
| 3,004,710 | 10/1961 | Couffer et al. | 251/11 X |
| 3,580,500 | 5/1971 | Quinn | 236/12.23 |
| 3,792,812 | 2/1974 | Knapp | 236/12.2 |
| 3,955,759 | 5/1976 | Knapp | 236/12.2 |
| 4,082,219 | 4/1978 | Rogers, Jr. et al. | 236/12.2 |

OTHER PUBLICATIONS

IBM Technical Disclosure Bulletin-vol. 23, No. 3-Aug. 1980-for "Motion Multiplier"-by H. Mastmann et al.

Primary Examiner—William E. Tapolcai, Jr.
Attorney, Agent, or Firm—Mark Levy; Melvin J. Scolnick

[57] ABSTRACT

A device capable of controlling and maintaining the temperature of water discharged from a kitchen faucet or shower at a preselected temperature level. An air-filled enclosure disposed within a mixing chamber regulates the precise amount of hot and cold water entering the mixing chamber as a function of the rate of thermal expansion of the air. A selector control is provided to set the preselected temperature level.

1 Claim, 2 Drawing Figures

CONTROLLER FOR MAINTAINING A CONSTANT TEMPERATURE OF DISCHARGED LIQUID

BACKGROUND OF THE INVENTION

To obtain water from a single source instead of separate hot and cold water taps, plumbing manufacturers have combined water sources downstream from separate taps, providing one spigot for outgoing, mixed water. Alternatively, one tap has been used to allow hotter or colder water to be discharged from a common outgoing pipe connected to two diverse temperature sources. In either of the above described systems, however, a user must let the water flow for some time while the resultant temperature of the water is adjusted. Moreover, the previously described systems offer no protection from sudden or sporadic hot or cold spurts. Thus each time any of the units has to be used, some amount of clean and fresh water is wasted. The present invention is intended to put an end to this wastage. It is thought to be more convenient than currently available systems and is economical to produce.

SUMMARY OF THE INVENTION

In accordance with the present invention, a controller is provided for combining two sources of liquid with two disparate temperatures to achieve mixed liquid at a predetermined temperature. A mixing chamber has a first inlet port for allowing a first source of liquid at a first temperature to flow into it and a second inlet port for allowing a second source of liquid at a higher temperature than the first temperature to flow into it. Inlet cutoff means allows one of the sources of liquid to enter the mixing chamber and prevents the liquid at the higher temperature from entering the mixing chamber. Temperature reacting means is adapted to actuate the inlet cutoff means so that liquid from the first source flows into the mixing chamber and liquid from the second source is prevented from flowing into the mixing chamber when the temperature of the mixed liquid is higher than the predetermined temperature. Similarly, liquid from the second source flows into the mixing chamber and liquid from the first source is prevented from flowing into the mixing chamber when the temperature of the mixed liquid in the mixing chamber is lower than the predetermined temperature.

It can be seen that one purpose of the present invention is to provide an economical means to mix liquid from two sources containing liquid at different temperatures relative to each other.

BRIEF DESCRIPTION OF THE DRAWINGS

This and other objects of the invention will be more easily understood and become more apparent with reference to the following detailed description taken in conjunction with the accompanying drawings in which.

DETAILED DESCRIPTION OF THE PREFERRED EMBODIMENT

Figure 1:
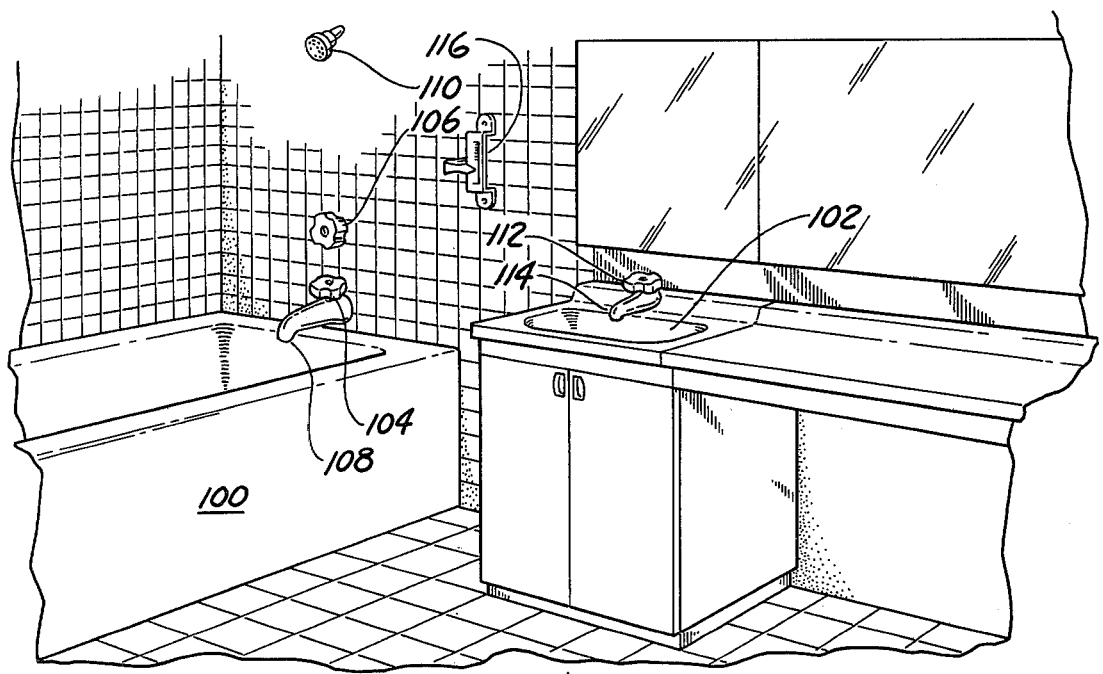
FIG. 1 is a perspective view of a bathroom showing the dial of the temperature controller of this invention.

FIG. 1 shows a typical bathroom in which are disposed a bathtub 100 and sink 102. The bathtub 100 has a bathtub tap 104 and a shower tap 106 for controlling the amount of water to be discharged from a bathtub spigot 108 and shower head 110 respectively. The sink 102 has a tap 112 for controlling the amount of water discharged from its associated spigot 114.

In accordance with the present invention, it should be noted here that only one spigot and tap is required for each appliance, as temperature of the discharged water is controlled by means other than those used in conventional two-tap systems.

A dial 116 is disposed on the wall in proximity to a bather or handwasher, not shown, for controlling the temperature of discharged water.

Figure 2:
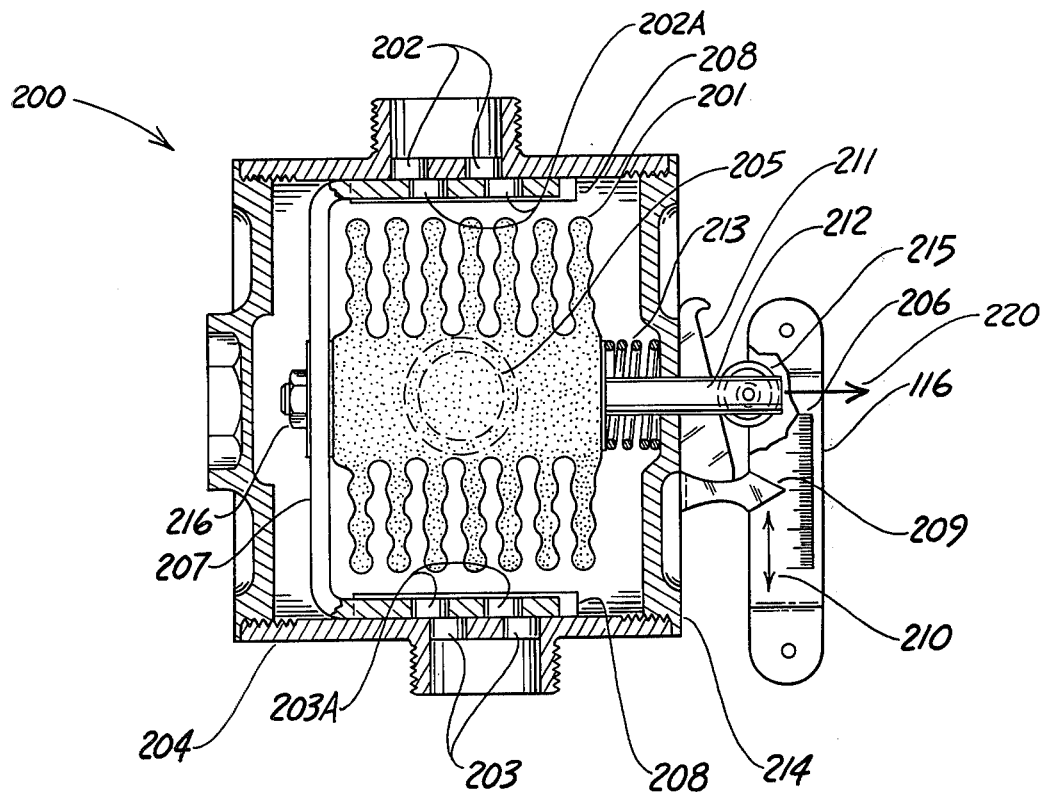
FIG. 2 is a sectional side view of the controller of this invention.

Referring now to FIG. 2, a sectional side view of the controller 200 for maintaining constant discharged liquid temperature is shown.

an irregularly-shaped bellows assembly or expandable enclosure 201, made of rubber or other suitable material, is filled with a gas, e.g., air, and completely sealed within the controller 200. Gas is used, rather than a solid substance, to fill the enclosure 201 due to the fact that gases have a greater coefficient of thermal expansion than do solid substances. This characteristic of gases is exploited, as will become clear hereinafter. The gas with which the enclosure 201 is filled has a coefficient of thermal expansion which is determined by the composition of the gas. It is suggested although not required that when the enclosure 201 is sealed, the gas have a temperature near the desired resultant liquid temperature. The enclosure 201 has seven parallel discs disposed along a horizontal axis, each of which discs appears as an irregularly-shaped protruding finger in the cross-sectional side view in FIG. 2. The parallel discs in this configuration of the enclosure 201 provide a relatively great surface area, and allow the enclosure 201 to expand or contract quickly when the temperature of the fluid surrounding the enclosure 201 changes.

Two apertures are shown at reference numeral 202, which apertures are inlet ports for a cold water source, not shown. Similarly, two apertures shown at reference numeral 203 are inlet ports for a hot water source.

A mixing chamber 204 is large enough to encase the enclosure 201. For purposes of this description, the right side of the mixing chamber 204 and the enclosure 201, as shown in FIG. 2, is considered the top. Therefore, references to the top or right are used interchangeably in this disclosure. The top cover of the mixing chamber 204 is indicated by reference numeral 214. This mixing chamber 204 is filled with water from the inlet ports 202 and 203 under circumstances that are described below.

An outlet port 205, shown in phantom, is disposed on the far wall of the controller 200 and allows mixed water to be discharged from the controller 200 to the associated tap, as shown at reference numerals 104, 106 or 112 in FIG. 1.

The dial 116 of the controller 200 consists of a dial scale 206 with imprinted gradations, along which a pointer 209 is adapted to move bidirectionally, as indicated by arrow 210.

Disposed within the mixing chamber 204 is a U-shaped subhousing 207 called a ratio control slide. This ratio control slide 207 is affixed to the bottommost disc of the enclosure 201 by means of a bolt 216. The ratio control slide 207 has apertures 202A and 203A corresponding to the inlet ports for cold water and hot water, 202 and 203, respectively. The ratio control slide 207 is adapted to move along the horizontal axis by means of guide rails 208 suitably mounted to the controller 200 by conventional means. An inclined block 211 is slidably mounted on the cover 214 of the mixing chamber 204. The pointer 209 is permanently affixed to this inclined block 211. A circular cam follower 215 is adapted to move along the horizontal axis as the inclined block 211 moves relative to it. The circular cam follower 215 is mounted on a shaft 212, the other end of which shaft is secured to the topmost disc of the enclosure 201 by suitable means.

A spring 213 is disposed along the shaft 212 between the mixing chamber top cover 214 and the topmost disc of the enclosure 201.

In operation, the user sets the pointer 209 to a desired temperature as shown on the dial scale 206. Since the pointer 209 is affixed to the inclined block 211, moving the pointer 209 also moves the inclined block 211 relative to the rotatable cam follower 215.

As the pointer 209 and inclined block 211 are moved downwardly, the rotatable cam follower 215 is forced to move towards the controller 200, thus causing the shaft 212 to which it is attached to move along the horizontal axis leftwardly, opposite to the direction of the arrow shown at reference numeral 220. The ratio control slide 207 is consequently forced in the same direction as the shaft 212. The spring 213 aids the movement of the ratio control slide 207 to move leftwardly.

Once this nominal position is obtained, the controller 200 is set for operation. Cold water is allowed to enter through input ports 202 and through the corresponding apertures 202A in the ratio control slide 207. Likewise, hot water is allowed to enter the mixing chamber 204 through the inlet ports 203 and the corresponding apertures 203A in the ratio control slide 207.

It can be seen that a relatively larger amount of hot water in the mixing chamber 204 will cause the air in the air-filled enclosure 201 to expand, thus forcing the ratio control slide 207 to move leftwardly, along the horizontal axis, and away from the mixing chamber cover 214. As the ratio control slide 207 moves leftwardly, the apertures 202A and cold water inlet ports 202 come more closely into alignment, allowing a greater amount of cold water to be mixed in the mixing chamber 204. Simultaneously, the hot water inlet ports 203 and the corresponding apertures 203A in the ratio control slide 207 are increasingly misaligned, thus reducing the amount of hot water which is allowed to enter the mixing chamber 204. The resultant temperature of the liquid in the mixing chamber 204 therefore decreases as more cold water enters and less hot water is allowed to enter the mixing chamber 204. As the resultant temperature decreases, the volume of air in the air-filled enclosure 201 also decreases, thereby allowing the ratio control slide 207 to move rightwardly towards an equilibrium position.

If a user moves the pointer 209 upwardly to indicate a warmer desired mixed water temperature, the inclined block 211 to which the pointer 209 is affixed is also moved upwardly. The rotatable cam follower 215 is thus allowed to move along the horizontal axis away from the mixing chamber top cover 214, thus forcing the ratio control slide 207 to move rightwardly. Once again, the influx of hot or cold water into the mixing chamber 204 will result in the expansion or contraction of air in the air-filled enclosure 201, respectively. The expansion or contraction of this air will result in the leftward or rightward movement of the ratio control slide 207, thus allowing more or less cold water to flow into the mixing chamber 204 relative to the inflowing hot water.

The mixing operation hereinabove described occurs only when the user has opened a valve or tap, not shown, connected to the outlet 205 of the mixing chamber 204. Any conventional tap, such as those shown in FIG. 1 as reference numerals 104, 106, or 112 can be used in this system.

It will be appreciated that the shape of the ratio control slide 207 can be a circular insert to fit snugly within the mixing chamber 204. Moreover, the inlet ports 202 and 203 for cold and hot water, respectively, need not be oppositely disposed as shown in FIG. 2. If they are in a different relative orientation, however, the apertures 202A and 203A of the ratio control slide 207 must also be located so as to correspond to that orientation for proper operation.

The present inventive system naturally will suggest many other alternatives, changes, and modifications to the skilled practitioner. Such alternatives, changes, and modifications are deemed to lie within those limits encompassing the full spirit and scope of the invention as presented by the appended claims.

What is claimed is:

1. A controller for combining two sources of liquid at two disparate temperatures to achieve mixed liquid at a predetermined temperature comprising:
   (a) a mixing chamber having a first inlet port for allowing a first source of liquid at a first temperature to flow therein and a second inlet port for allowing a second source of liquid at a higher temperature than said first temperature to flow therein, said mixing chamber having an outlet port for allowing said mixed liquid in said mixing chamber to flow therefrom;
   (b) a slidable housing having an aperture associated with each of said inlet ports respectively, said slidable housing disposed within said mixing chamber and adapted to be moved relative to said inlet ports to allow the first of said sources of liquid to enter said mixing chamber and to prevent said liquid at said higher temperature from entering said mixing chamber;
   (c) means for setting a predetermined temperature level operatively connected to said slidable housing, said setting means comprising:
      (i) a spring loaded shaft operatively connected to said slidable housing for movement therewith;
      (ii) a cam follower rotatably mounted on said shaft; and
      (iii) an inclined block slidably affixed to said slidable housing and in operative relationship to said cam follower for movement therewith, such that a movement of said inclined block to a position representative of a predetermined temperature level produces a corresponding movement of said slidable housing relative to said inlet ports, thereby allowing one of said sources of liquid to enter said mixing chamber and preventing the other of said sources of liquid from entering said mixing chamber, said inclined block including a pointer for indicating a predetermined temperature level when said means for setting a predetermined temperature level is set; and
   (d) an expandable enclosure filled with gas adapted to actuate said slidable housing, whereby liquid from said first source at said first temperature flows into said mixing chamber and liquid from said second source at said higher temperature is prevented from flowing into said mixing chamber when the temperature of the mixed liquid in the mixing chamber is higher than the predetermined temperature, and whereby liquid from said second source at said higher temperature flows into said mixing chamber and liquid from said first source at said first temperature is prevented from flowing into said mixing chamber when the temperature of the mixed liquid in the mixing chamber is lower than the predetermined temperature.

* * * * *